United States Patent [19]

Hong et al.

[11] Patent Number: 4,672,704
[45] Date of Patent: Jun. 16, 1987

[54] FRAME ASSEMBLY FOR COLLECTING ROYAL JELLY

[76] Inventors: Soon Y. Hong; Keum P. Hong, both of Av. Amores 1126, Dep. 201, Colonia del Valle, Mexico, D.F. 12

[21] Appl. No.: 800,216

[22] Filed: Nov. 21, 1985

[30] Foreign Application Priority Data

Jan. 22, 1985 [KR] Rep. of Korea ............... 7020[U]

[51] Int. Cl.⁴ .......................................... A01K 47/02
[52] U.S. Cl. ............................................... 6/10
[58] Field of Search .................................. 6/10, 11

[56] References Cited

U.S. PATENT DOCUMENTS

| | | | |
|---|---|---|---|
| 1,782,202 | 11/1930 | Frater | 6/10 X |
| 2,150,067 | 3/1939 | Kelley | 6/10 |
| 4,186,458 | 2/1980 | Caviglia, III | 6/10 |
| 4,392,262 | 7/1983 | Stickler | 6/11 X |

FOREIGN PATENT DOCUMENTS 827439 1/1952 Fed. Rep. of Germany ............ 6/10

Primary Examiner—Robert P. Swiatek
Attorney, Agent, or Firm—Erik M. Arnhem

[57] ABSTRACT

A molded plastic frame, especially for collecting royal jelly, is disclosed. The frame includes a horizontal top frame member which has at each one of its respective ends formations for engaging and locking, with the engaging formations including a tapering surface formation, and the locking formations include a locking lip. The frame also has at least two vertically disposable side member assemblies which can be releasably connected to the top frame member in such a way that they are releasably connected by way of an insert mode which precludes the removal of a respective side member without deformation of the locking lip. The frame assembly also includes at least one transverse jelly cup bar which can be connected to the frame between the vertically disposed side members assemblies.

7 Claims, 9 Drawing Figures

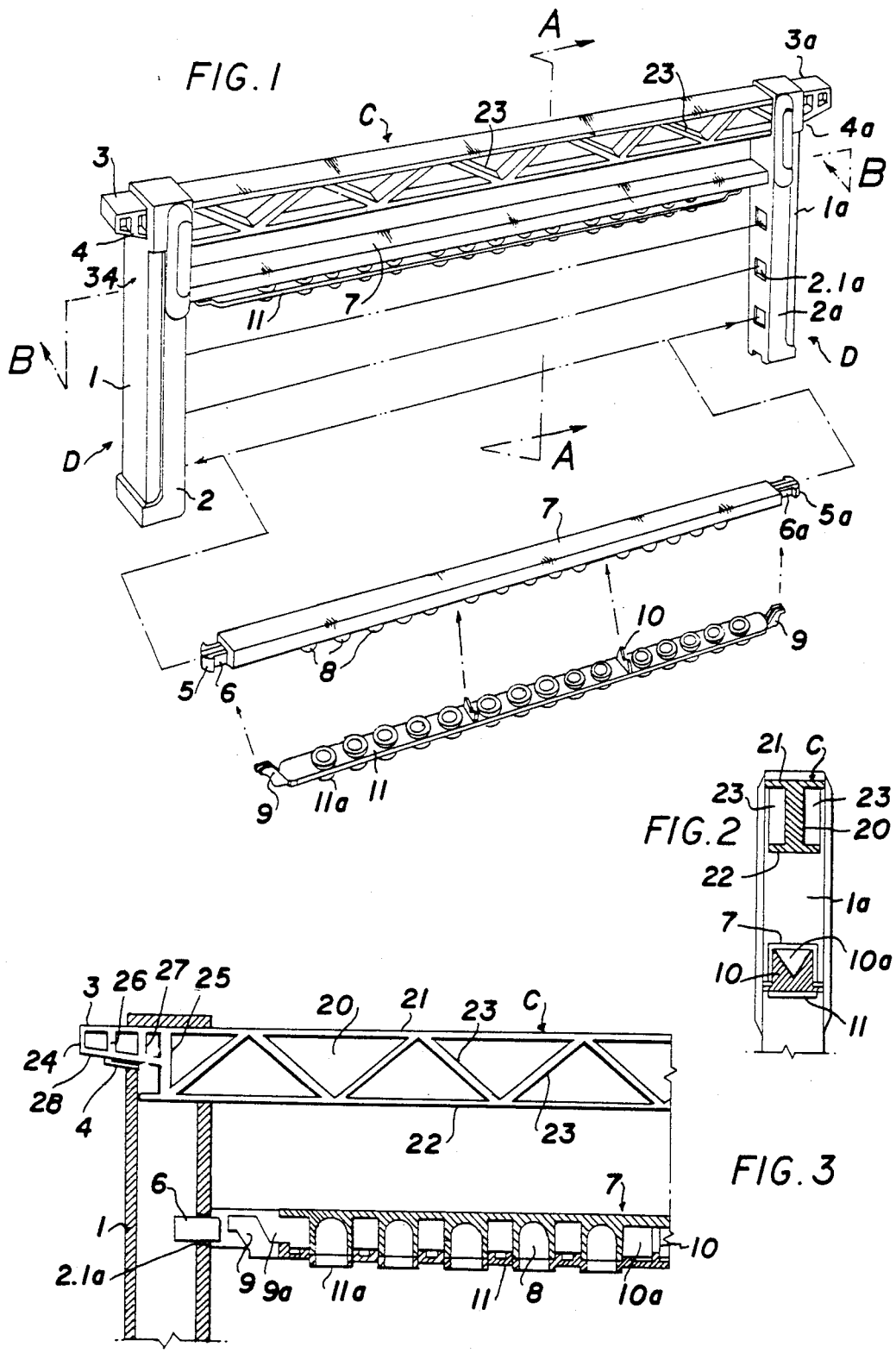

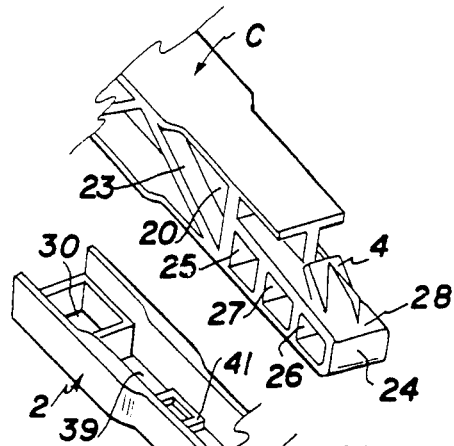
FIG. 4
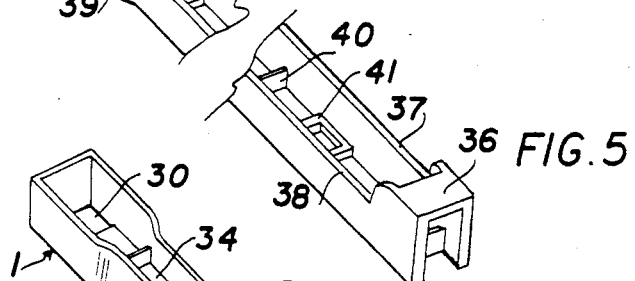
FIG. 5
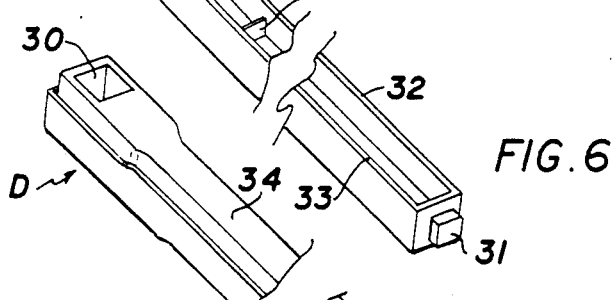
FIG. 6
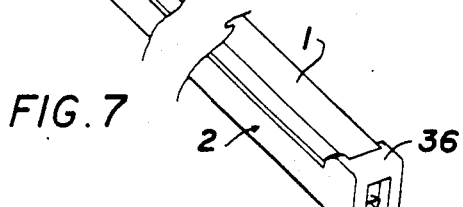
FIG. 7
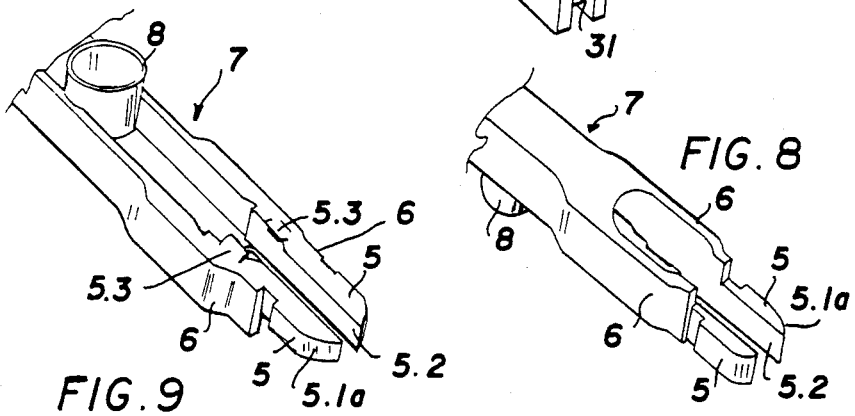
FIG. 8
FIG. 9

FRAME ASSEMBLY FOR COLLECTING ROYAL JELLY

CROSS-REFERENCE TO RELATED APPLICATIONS So. Korean patent application filed 1.22.1985.

BACKGROUND OF THE INVENTION

1. Field of the Invention

The invention may be classified in class 6 and appropriate sub-classes.

Our present invention relates generally to improvements in or relating to apiarian frames and, more particularly, to an improved frame assembly which is comprised of individual interconnectable frame components made of molded plastic.

Still more particularly, our invention relates to a molded plastic frame assembly comprised of individual components, which frame serves to collect royal jelly.

Three distinct phases can be observed in the life of a worker bee. In the first phase, or "nurse bee" phase, the bee helps with incubating the brood and with preparing the brood cells. This phase also includes feeding of the older larvae which receive a mixture of honey and pollen gathered by the foragers. After about three days, the special brood food glands in the head of the worker become active, and the young bee proceeds with feeding the younger larvae with a concentrated milky secretion from its glands, known as bee milk, brood food, or "royal jelly" because this plays an important role in the development of the queen bee.

Descriptions of royal jelly production may be had from "The ABC and XYZ of Bee Culture", published by the A. I. Root Company, Medina, Ohio; and from "The Beekeeper's Handbook", published by Peach Mountain Press Ltd., Dexter, Mich.

2. Prior Art

The prior art includes U.S. Pat. Nos. 1,426,551; 1,787,840; 2,335,044; 3,485,519; 3,758,896; 3,936,894; 4,186,458; 4,216,557; 4,234,985; 4,374,440; 4,403,358; and 4,453,281.

Previous devices for collecting royal jelly were fixed devices which required frequent scraping of excreted wax, often causing loss of royal jelly.

There has continued to remain interest in apiarian devices, and improvements in or relating to frames, e.g. foundation or honeycomb frames, have included the replacement of the conventional wooden frame structures by plastic frame structures comprised of individual interconnectable frame components.

However, there has continued to remain the need for improvements in bee frames comprised of plastic and interconnectable frame components, and which are particularly suited for the collection of royal jelly accumulated in the bee hive.

SUMMARY OF THE INVENTION

Our invention is generally directed towards the provision of an improved plastic apiarian frame comprised of individual interconnectable frame components. The individual frame components include a horizontal top bar or member, two vertical side bar assemblies, and one or several intermediate transverse members, and a bottom bar, as required for the particular use of the frame. The individual components are equipped with endwise connector means including engaging and self-locking formations.

The frame is particularly designed to provide a base for arranging of a plurality of small cups or containers for collecting royal jelly in a beehive.

Included in the objects of our invention are:

To provide an improved apiarian frame comprised of plastic molded interconnectable frame components which can be economically produced.

To provide an improved apiarian frame, comprised of plastic molded interconnectable frame components which is easily assembled and disassembled.

BRIEF DESCRIPTION OF THE DRAWINGS

The above and other objects, features and advantages will become apparent from the following description, reference being made to the accompanying drawing in which:

FIG. 1 is a perspective view of the apiarian frame in accordance with one embodiment of our invention, with the cup bar near the top bar shown in the assembled condition and the cup holder for use near the bottom of the frame being shown in disassembled condition prior to mounting in the frame.

FIG. 2 is a cross section along line A—A in FIG. 1.

FIG. 3 is a cross-sectional view of the frame according to FIG. 1 near the upper portion of the frame, taken along line B—B in FIG. 1.

FIG. 4 is a perspective view of one end of the upper frame member.

FIG. 5 is a perspective view of the inner side member, particularly the interior thereof.

FIG. 6 is a perspective view of the closed outer side member particularly showing the interior thereof.

FIG. 7 is a perspective view of the assembled vertical column showing particularly the nesting of the outer member in the inner member.

FIG. 8 is a perspective view of the connecting end for the cup holder.

FIG. 9 is a perspective view similar to FIG. 8, but showing the end from below.

SPECIFIC DESCRIPTION

In the drawing like reference characters designate like elements in the various views of the drawings.

Reference in this disclosure to up and down refers to the respective attitude of the frame in its installed position in the beehive.

Our frame firstly includes a top bar C, or the like member. As can best be seen in FIG. 2, this top bar C has generally a cross-sectional configuration of that of an I-beam. Thus, it includes a central web 20 and upper an lower bars 21 and 22, respectively. The top member C is strengthened by lateral and diagonally or triangularly disposed stiffeners 23.

Each end of the top member C is formed with a wedge-type and locking formation, namely the end 3 at the left end, and end 3a at the right end (FIG. 1). Each wedge and lock formation tapers with its underside from the short end face or wall 24 (FIGS. 3 and 4) towards the transverse plate element 25 which typically terminates the I-beam structure at each one of the two ends. Each one of the wedge-type and locking formations is a partial continuation of the I-Beam structure and includes, for example, two lateral stiffeners 26 and 27 on each side.

A lock lip 4 is provided at the lower plate element 28 which defines the base of the I-beam structure of the wedge formation 3. The lock lip 4 projects at a small angle away from the lower plate element 28. The lock lip 4 may be somewhat narrower in its width than the width of the end 3, or 3a of the top member C (compare FIG. 4).

As mentioned, the wedge-type and locking formation is also provided at the other side of the top member C, and they are respectively designated by reference numerals 3a and 4a on the right-hand side of the embodiment in FIG. 1. The ends 3 and 3a may have a lesser width than the central portion of the top member C.

Our frame further includes two vertically disposed side columns or post assemblies D which are respectively formed of a closed outer side member 1 and an inner side member 2 which is formed so as to complement the outer side member 1 for construction of a respective vertical post assembly D. Thus, an outer side member 1 is joined to the respective inner side member 2 to form a vertical column D of generally rectangular cross section, see FIG. 7. In their assembled condition for completing the frame assembly, the two columns D are dependingly disposed from the top bar C in the beehive, and the cup holder or cup bars 7, or royal jelly collector bars, are disposed in parallel relationship with respect to one another between the columns D. In the FIG. 1 of the drawing, the right hand column is comprised of the closed side member 1a and the respective inner side member 2a.

In order to secure the holders 7 thereat, each column D includes a plurality of substantially square openings 2.1a in the respective inner side member 2, or 2a, and a respective end of the bar 7 is introduced and locked in a respective opening 2.1a, as will be described below.

The ends 3 and 3a of the top member C are similarly introduced in the respective openings 30 of each column D. Each locking lip 4 is capable of being introduced through an opening 30 in each column D because of its resilient flexing on being pushed through the opening 30, and then assuming again its angularly inclined attitude. Thus, the free end of lip 4 will point away from the lower plate element 28 and support itself on the outer wall 34 of the side member 1 (see FIGS. 1 and 7). The locking lip 4, accordingly, precludes the return or release of the top member C, particularly the ends 3 and 3a thereof, from the two vertical columns D upon being secured as described.

The closed outer side member 1, or 1a, which serves as the outer member of each vertical post or column D, is generally comprised of a U-shaped channel structure when contemplated in cross section, see also FIG. 6. The side member 1 typically includes at its lower end a solid peg 31 of generally square configuration. The outer side member 1 has parallel side walls 32 and 33 providing the upstanding portions of the u-configuration, and the mentioned outer surface or wall 34 forming the base thereof. Stiffeners 35 are disposed within the channel structure of the outer side member 1. At the upper end, the side member 1 includes a frame structure which is open at the upper terminus of the outer wall to leave the said opening 30 in conjunction with the inner side member 2 (FIG. 7). The frame structure of the outer side member 1 is somewhat larger in its overall outer dimensions than the longitudinal body formed by the side walls 32 and 33.

The inner side member 2, or 2a, is adapted in configuration to the outer side member 1, and it is also generally comprised of a U-shaped channel structure, but which is sufficiently wider to receive in a toe-to-toe fashion the narrower outer side member 1, see particularly FIG. 7. The inner side member 2 includes an L-shaped base 36 (when viewed in the side elevation) which is adapted to receive therein the peg 31 of the outer member 1. The inner side member 2 has parallel side walls 37 and 38 providing the upstanding portions of the U-shaped configuration, and an inner wall member 39 forming the base thereof and in which are formed the square openings 2.1a. Stiffeners 40 are disposed within the channel structure of the inner side member 2. These openings 2.1a can be reinforced by corresponding raised formations 41 on the interior surface of the wall member 39. At its upper end, the inner side member 2, or 2a, includes a frame structure which is open at the upper terminus of the inner wall 39 to leave the said opening 30 in conjunction with the outer side member 1. This frame structure is somewhat larger in its overall outer dimensions than its longitudinal body which is formed by the upstanding side walls 37 and 38.

For assembly, the peg 31 of the outer side member 1, or 1a, is introduced in the L-shaped base 36 of the inner side member 2, or 2a, whereby the wall pairs are aligned in parallel and with the walls 32 and 33 of the outer side member 1 resting on the stiffeners 40 of the inner side member 2. The respective upper frame structures of the two members are also nesting in one another to form the passage 30. It will be obvious that the assembly of the two side members is held together by the square peg 31 introduced in the base 36 and the slight frictional contact between the engaging wall pairs. The assemblies are further secured by the wedge ends 3 and 3a of the top member C, as described.

The frame assembly of our invention also includes the cup bar or holder 7 which is connectable with its ends in the square holes 2.1a of the vertical post assemblies D. Thus, the cup holder 7 also has a generally a channel-type configuration (FIG. 2). The cup holder 7 has a pair of flat webs 6 and 6a at its respective ends (FIG. 1) which terminate in hook ends 5 and 5a, respectively.

A plurality of cylindrical hollow cups 8 is disposed at the bottom side or wall of the holder 7. The interior of each cup 8 is adapted to retain a portion of royal jelly that is being collected in the frame. There are square holes 2.1a for four cup holders 7, as is shown in FIG. 1.

Although the cup holder 7 will be of sufficient rigidity to be self-supporting in the frame assembly, it may be useful to add a further cover plate or strip element 11 with cup extenders 11a. This strip element 11 has yoke ends 9 adapted to cooperate with the ends of the holder 7, in each opening or passage 2.1a.

The strip element 11 has one or several connectors 10 which can engage in openings or passages 10a of the cup holder 7 to secure the holder 7 and the element 11 to one another.

A particularly preferred embodiment of the ends of the cup holder 7 for cups 8 is shown in FIGS. 8 and 9. The ends include the aforementioned lock hooks 5 at the web portions 6. The lock hooks 5 extend over approximately one half the height of the webs 6 from the common base line. The hooks 5 have outwardly rounded outer surfaces 5.1a, but present planar sides or surfaces 5.2 towards one another. It will be appreciated that the hook ends can be resiliently pressed together to facilitate introduction into the respective opening 2.1a for assembly of the frame. Retainer lips 5.3 can also be provided at the bottom side of the holder 7 (see FIG. 9).

While our invention has been described and illustrated with respect to a preferred embodiment, it is not intended to restrict the scope of the appended claims, which themselves recite those features regarded as essential to the invention.

We claim:

1. A frame for collecting royal jelly in beehives, said frame being adapted to be assembled and disassembled and being fully made of molded plastic elements, including:
   a longitudinal top element, said top element having a first connecting end, an intermediate portion, and a second connecting end opposite to said first connecting end; said first and said second connecting ends having means for engaging and locking;
   at least two vertically disposable side member assemblies, whereby each assembly is comprised of a closed outer side element and an inner side element, and each assembly presents a passage for the respective end of said longitudinal top element, and each inner side element is furnished with at least one opening;
   at least one holder for a plurality of jelly cups, said holder being connectable with its ends in a respective opening of a respective inner side element; and
   for each at least one holder, means for extending the respective jelly cups.

2. The frame according to claim 1 wherein at least one outer element is adapted to be nestingly mounted in the respective inner element.

3. The frame according to claim 1 wherein said means for extending the respective jelly cups includes a cup extender strip, said cup extender strip having ends which are cooperatingly projecting towards the ends of said at least one holder.

4. The frame according to claim 1 wherein said engaging and locking means are identical at each end of said top frame element.

5. The frame according to claim 4 wherein said engaging and locking means are compressible end formations adapted to be introduced into an opening of a respective inner side element by being compressed and adapted to resiliently return to the rest state on being introduced by a predetermined length of distance into the opening of the respective inner side element.

6. A plastic frame, especially for collecting royal jelly, said frame comprising in combination:
   a top frame member, said top frame member being adapted to be horizontally disposed in a beehive and having at each one of its respective ends means for engaging and locking, wherein said engaging means includes at least a wedge formation which tapers at least on one side, and said locking means include at least one locking lip;
   at least two vertically disposable side member assemblies, with each one of said side member assemblies being adapted to be engaged by the respective end of said top frame member in such a way that they can be connected thereto by an insert mode, but which precludes the removal of a respective side member assembly without deformation of said at least one locking lip; and
   at least one holder for a plurality of cups for storing royal jelly, said holder being connectable with its ends at and between said side member assemblies to extend substantially parallel with respect to said top frame member; and
   means for extending the respective jelly cups, said means including a cup extender strip having ends which are cooperatingly projecting towards the ends of said holder.

7. A plastic frame, especially for collecting royal jelly, said frame comprising in combination:
   a top frame member, said top frame member being adapted to be horizontally disposed in a beehive and having at each one of its respective ends means for engaging and locking, wherein said engaging means include at least a wedge formation which tapers at least on one side, and said locking means include at least one locking lip;
   at least two vertically disposable side member assemblies, with each one of said side member assemblies being adapted to be engaged by the respective end of said top frame member in such a way that they can be connected thereto by any insert mode, but which precludes the removal of a respective side member assembly without deformation of said at least one locking lip; and
   at least one holder for a plurality of cups for storing royal jelly, said holder being connectable with its ends at and between said side member assemblies to extend substantially parallel with respect to said top frame member.

* * * * *